United States Patent [19]
Wilczynski

[11] Patent Number: 6,125,573
[45] Date of Patent: Oct. 3, 2000

[54] ADJUSTABLY MOUNTED ULTRA-SENSITIVE FISH BITE INDICATOR

[76] Inventor: Gregory Wilczynski, 246 Big Terra La., Gurnee, Ill. 60031

[21] Appl. No.: 09/221,012

[22] Filed: Dec. 23, 1998

[51] Int. Cl.[7] .................................................. A01K 97/12
[52] U.S. Cl. ........................................... 43/25; 43/17
[58] Field of Search ....................... 43/17, 25, 24

[56] References Cited

U.S. PATENT DOCUMENTS

| | | | |
|---|---|---|---|
| 3,143,822 | 8/1964 | Schooley | 43/17 |
| 3,187,456 | 6/1965 | Apitz . | |
| 3,344,547 | 10/1967 | Schroeder . | |
| 3,529,375 | 9/1970 | Dey . | |
| 3,571,536 | 3/1971 | Sparks | 43/17 |
| 3,814,048 | 6/1974 | Bartholomew | 43/17 |
| 3,916,554 | 11/1975 | Hullett . | |
| 4,020,579 | 5/1977 | Snider . | |
| 4,420,900 | 12/1983 | Nestor | 43/17 |
| 4,429,481 | 2/1984 | Handa | 43/19.2 |
| 4,905,398 | 3/1990 | Botbyl . | |
| 5,287,646 | 2/1994 | Kuhlman . | |
| 5,735,073 | 4/1998 | Kuhlman . | |

FOREIGN PATENT DOCUMENTS

| | | | |
|---|---|---|---|
| 0583789 | 12/1977 | U.S.S.R. | 43/25 |

*Primary Examiner*—Jack W Lavinder
*Attorney, Agent, or Firm*—Brinks Hofer Gilson & Lione

[57] ABSTRACT

An ultra-sensitive bite indicator having a mount, a spring and a wire, is attached to a distal end of a fishing rod, with the mount having a through-bore. The spring is adjustably mounted within the through-bore, and the wire is connected to the spring at one end and to a loop, constructed and arranged to receive fishing line, at another end. In another embodiment of this invention, an ultra-sensitive bite indicator comprises a mount portion attached to a fishing rod and an adjustment portion coupled to the mount portion. The adjustment portion is movable between a first position angled away from the fishing rod and a second position lying substantially flat against the fishing rod. A loop, constructed and arranged to receive a fishing line, is attached to one end of the adjustment portion. In each embodiment, the bite indicator is difficult to damage or break. In addition, the sensitivity of each embodiment of the bite indicator can be adjusted for detecting fish of various sizes and weights.

24 Claims, 5 Drawing Sheets

ADJUSTABLY MOUNTED ULTRA-SENSITIVE FISH BITE INDICATOR

BACKGROUND OF THE INVENTION

1. Field of the Invention

This invention relates to an ultra-sensitive bite indicator having a rugged design which prevents the bite indicator from being easily damaged during use or transport and an adjustment means which allows the user to vary the sensitivity of the bite indicator for detecting fish of various sizes and weights.

2. Description of Prior Art

In the fishing industry, many manufacturers have attempted to design ultra-sensitive bite indicators which flex as a result of the slightest movement in the hook or bait. Conventional ultra-sensitive bite indicators have been designed for two types of fishing rods: fishing rods with spinning reels and fishing rods with casting reels. In a fishing rod having a spinning reel, the fishing line travels below the fishing rod. A conventional ultra-sensitive bite indicator for rods with spinning reels, referred to as a spinning reel indicator, is normally constructed by attaching a wire to the far edge of the fishing rod. The wire extends out past the far edge of the fishing rod and forms a loop designed to receive fishing line. Even the slightest pull on the line by a fish will cause the wire to flex, thus signaling to the fisherman that a fish is biting.

Many of such conventional spinning reel indicators are constructed from a single strand of wire which, when a fish is hooked at the end of the fishing line, becomes significantly bent and often times damaged. If the wire is damaged, the wire must be straightened by the fisherman in order for the spinning reel indicator to work properly. Furthermore, much care has to be taken during the transport of spinning reel indicators to and from the fishing site since the wire is often bent during transport. Some conventional spinning reel indicators are designed so that they can be removed from the pole in order to reduce the amount of damage incurred during the transport, however removing the spinning reel indicator after every use can be cumbersome.

Additionally, conventional spinning reel indicators cannot be adjusted in order to detect fish of varying sizes and weights. Conventional spinning reel indicators are designed to support lures of a predetermined weight and are unable to detect fish of various sizes and weights. When the fisherman attempts to use lures which are either lighter or heavier than the conventional spinning reel indicator is designed for, the conventional spinning reel indicator will not flex properly and thus fail to accurately detect fish bites.

In a fishing rod having a casting reel, the fishing line travels above the fishing rod. A conventional ultra-sensitive bite indicator for rods with casting reels, referred to as a casting reel indicator, is normally constructed by indirectly mounting a wire onto a rod handle connected to one end of the fishing rod. The wire is mounted in a first position at an angle with respect to the rod handle. Fishing line is fed through a guide mounted on the rod handle and a loop attached to the far end of the wire. When a fish bites the bait or lure attached to the end of the fishing line, the tension in the line pulls the loop down towards the fishing rod, causing the wire to flex, thus signaling that a fish is biting. Often times, such flexing will cause the wire to break, since the wire lacks sufficient support. Furthermore, since the wire always remains at an angle with respect to the rod handle the wire can get easily caught, bent, or severely damaged during transport from one site to another.

In an attempt to reduce the amount of damage, many conventional casting reel indicators are constructed using heavy wire designed to withstand a larger amount of tension from the fishing line. However, conventional casting reel indicators using heavy wire often lack the sensitivity needed to detect lighter fish. Furthermore, since conventional casting reel indicators cannot be adjusted to support lures of varying weight, a fisherman must be limited to detecting one type of fish, or carry separate fishing rods having separate casting reel indicators designed for light and heavy fish.

U.S. Pat. No. 3,529,375 discloses an ultra-sensitive fish-bite indicator including a flexible fine drawn spring-tempered wire having an eyelet at its free end for passage of a fishing line. The wire is designed to support only an ultra-lightweight bait and operable only to flex in response to the slightest movement.

U.S. Pat. No. 4,020,579 discloses a bite signaling attachment for ice fishing poles having an elongated spring structure fixedly attached to the outer end of a fishing rod with the elongated spring structure projecting past the end of the fishing rod. The light construction of the elongated spring structure allows the latter to support a short length of fishing line.

It is apparent from the conventional ultra-sensitive bite indicators that there is a need for an ultra-sensitive bite indicator for rods with spinning reels that has an adjustment means for varying sensitivity in order to detect fish of various sizes and weights; that can readily be transported from one fishing site to another fishing site without breakage; and that can be used to detect a variety of fish without damage to the bite indicator. It is also apparent that there is a need for an ultra-sensitive bite indicator for rods with casting reels that has an adjustment means for varying sensitivity in order to detect fish of various sizes and weights; that can readily be transported from one fishing site to another fishing site without breakage; and that can be used to detect a variety of fish without damage to the bite indicator.

SUMMARY OF THE INVENTION

It is one object of this invention to provide an ultra-sensitive bite indicator for rods with spinning reels that has an adjustment means for varying sensitivity in order to detect fish of various sizes and weights.

It is another object of this invention to provide an ultra-sensitive bite indicator for rods with spinning reels that can easily be transported from one fishing site to another fishing site without breakage.

It is another object of this invention to provide an ultra-sensitive bite indicator for rods with spinning reels that can be used to detect a variety of fish without damage to the bite indicator.

It is still another object of this invention to provide an ultra-sensitive bite indicator for rods with casting reels that has an adjustment means for varying sensitivity in order to detect fish of various sizes and weights.

It is another object of this invention to provide an ultra-sensitive bite indicator for rods with casting reels that can easily be transported from one fishing site to another fishing site without breakage.

It is yet another object of this invention to provide an ultra-sensitive bite indicator for rods with casting reels that can be used to detect a variety of fish without damage to the bite indicator.

The above and other objects of this invention are accomplished with an ultra-sensitive bite indicator having a unique mounting configuration. In one preferred embodiment according to this invention, a fishing rod has a proximal end connected to a rod handle and opposing a distal end. A mount having a through-bore is fixedly mounted above and at the distal end of the fishing rod. A guide is mounted below and at the distal end of the fishing rod. A spring having an end foot is mounted within the through-bore and above the guide. The end foot extends out past the distal end of the fishing rod wherein the end foot is attached to one end of a wire. A loop constructed and arranged to receive the fishing line is attached to the other end of the wire.

A spinning reel is mounted below the rod handle and fishing line is drawn from the spinning reel, threaded through the guide and then through the loop, and attached to a lure. When a fish bites on the lure, a force is applied to the fishing line causing the spring, not the wire, to flex and signal that a fish is biting on the line.

This configuration is ideal for fishing rods with spinning reels. By attaching an end foot of the spring to one end of the wire, the spring acts to absorb any force which otherwise would cause the wire to flex. Since the wire no longer flexes, it becomes much more difficult to damage or break the wire. In addition, because the spring absorbs all the force, the wire can be manufactured from a more rigid material which can be used to support heavier lures and bait.

Additionally, since the bite indicator maintains a very rugged design, the bite indicator does not have to be removed from the fishing pole during transportation from one fishing site to another fishing site, thus greatly simplifying the transportation of such a bite indicator mounted onto a fishing rod.

In another preferred embodiment according to this invention, the spring is adjustably mounted in the through-bore with respect to the mount. This configuration allows the sensitivity of the bite indicator to be varied in order to detect fish of various sizes and weights. For example, if a fisherman needs to detect small sized fish, the bite indicator can be made more sensitive by pushing the spring out, away from the proximal end of the fishing rod, thus reducing the force required to flex the spring and signal a bite. Conversely, if larger sized fish need to be detected, the bite indicator can be made less sensitive by pushing the spring in, towards from the proximal end of the fishing rod, thus increasing the force required to flex the spring and signal a bite. By pushing the spring in, the indicator can withstand the weight of heavier bait being placed on the line, while still signaling a bite.

In another preferred embodiment according to this invention, a mount portion is mounted above and at the distal end of the fishing rod. A guide is mounted above and in between the distal end and proximal end of the fishing rod. A first end of an adjustment portion is coupled to said mount portion and opposes a second end. The adjustment portion is preferably made from a generally flat sheet of steel. The adjustment portion is movable between a first position in which the adjustment portion is angled away from the fishing rod and a second position in which the adjustment portion lies flat against the fishing rod. The second end of the adjustment portion is attached to a loop constructed and arranged to receive a fishing line. While in the second position, the second end of the adjustment portion does not extend past the distal end of the fishing rod.

In this embodiment, a casting reel is mounted above the rod handle and fishing line is drawn from the casting reel, threaded through the guide and then through the loop, and attached to a lure. When a fish bites the lure, the adjustment portion moves downwards towards the fishing rod. If the fish is pulling against the line with enough force, the adjustment portion will fall downwards until it is in the second position, pressed flat against the fishing rod. In the second position, the adjustment portion is supported by the fishing rod, and therefore the majority of the force applied to the adjustment portion is absorbed by the fishing rod. Since the fishing rod absorbs a majority of the force, a very sensitive and thin piece of steel can be used for the adjustment portion without concern that the bite indicator will become damaged or broken. In addition, if the adjustment portion is held in the second position, the bite indicator can be easily transported from one fishing site to another fishing site without damage.

In another preferred embodiment according to this invention, the sensitivity of the bite indicator can be varied for detecting fish of various sizes and weights. For example, if a fisherman needs to detect smaller fish, the bite indicator can be made more sensitive by bending the adjustment portion downwards towards the fishing rod, decreasing the amount of force required to move the adjustment portion and thus making it easier to detect small fish. Conversely, if a fisherman wishes to detect larger fish, the bite indicator can be made more sensitive by bending the adjustment portion upwards and away from the fishing rod, increasing the amount of force required to move the adjustment portion and thus allowing larger bait to be supported in order to detect large fish.

BRIEF DESCRIPTION OF THE DRAWINGS

The above-mentioned and other features and objects of this invention will be better understood from the following detailed description taken in conjunction with the drawings wherein.

DESCRIPTION OF PREFERRED EMBODIMENTS

Figure 1:
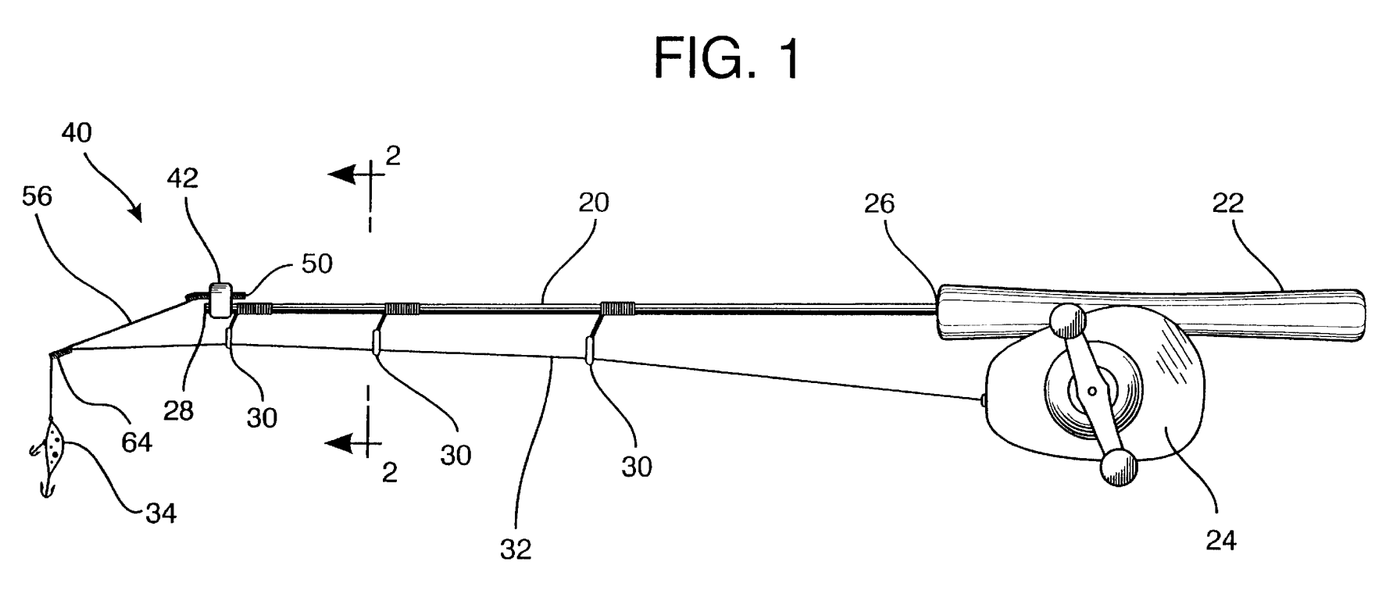
FIG. 1 is a side view of a bite indicator mounted to a fishing rod, according to one preferred embodiment of this invention.
Figure 2:
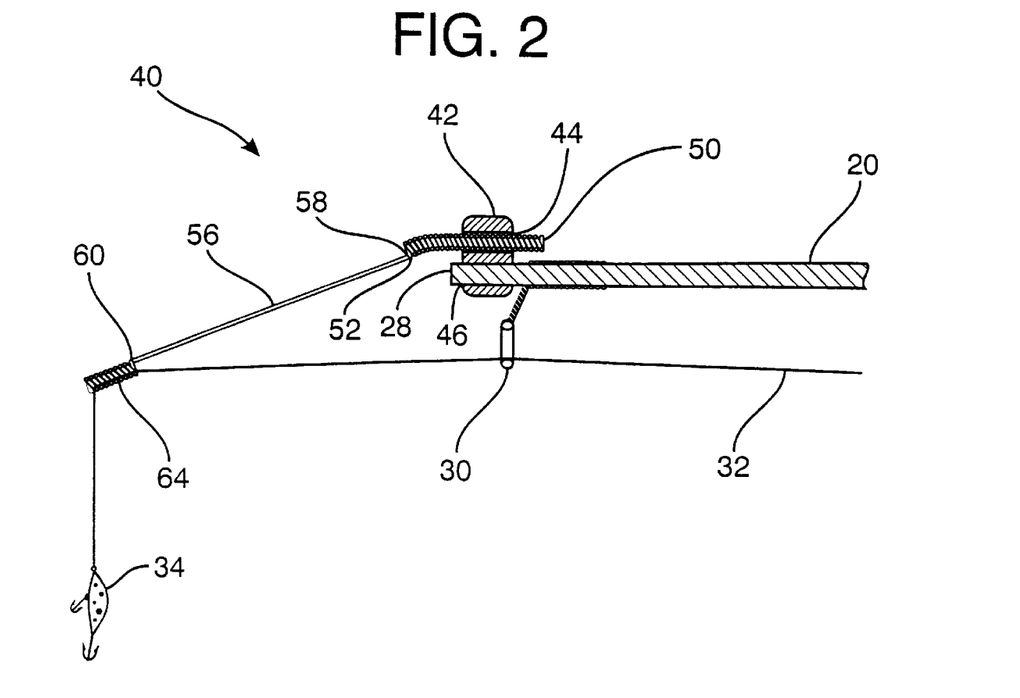
FIG. 2 is a cross sectional side view of the bite indicator shown in FIG. 1 in a first position.
Figure 3:
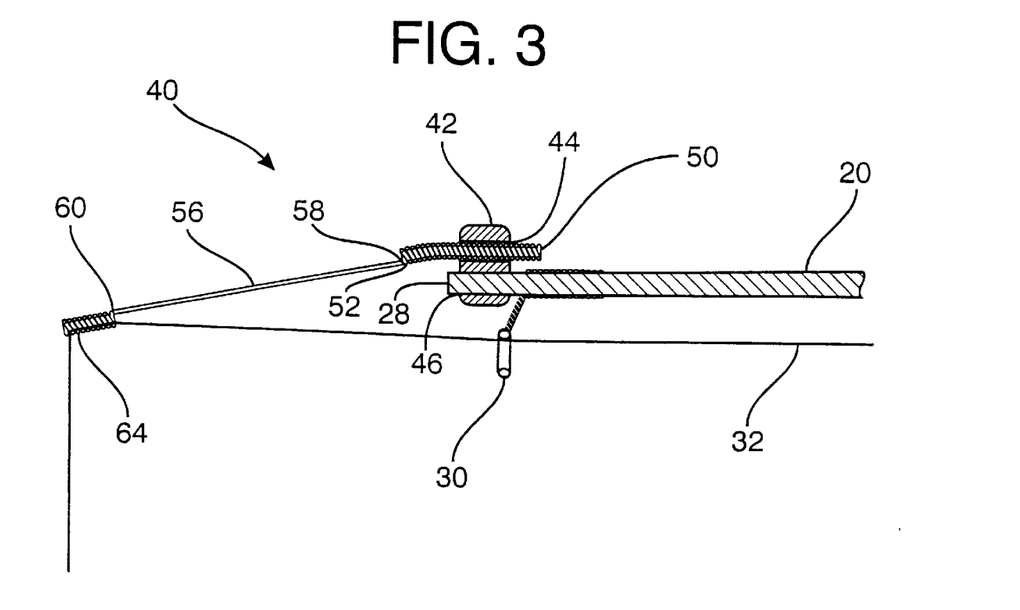
FIG. 3 is a cross sectional side view of the bite indicator shown in FIG. 1 in a second position.

FIGS. 1–3 show an ultra-sensitive bite indicator for rods with spinning reels, spinning reel indicator 40, according to one preferred embodiment of this invention. Spinning reel indicator 40 comprises mount 42, spring 50, wire 56, and loop 64. Spinning reel indicator 40 is mounted on fishing rod 20, as discussed below. Fishing rod 20 comprises proximal end 26 connected to rod handle 22 and opposing distal end 28. Spinning reel 24 is mounted below rod handle 22 and houses fishing line 32.

As shown in FIG. 2, mount 42 is attached onto fishing rod 20 near the distal end 28 of fishing rod 20. Mount 42 may be securely fastened by using wire, glue, screws or any other comparable means. In one preferred embodiment of this invention, mount 42 is constructed from rubber. While mount 42 can be constructed from other suitable materials such as plastic, steel or even wood, rubber is preferred because rubber is easily malleable and holds well when mounted onto fishing rod 20.

Mount 42 preferably houses through-bore 44. Through-bore 44 is generally cylindrical in shape in order to accommodate spring 50, as discussed below. However through-bore 44 may have a rectangular cross-section or take any other hollowed-out form, as long as through-bore 44 accommodates spring 50. While through-bore 44 does not have to go all the way through mount 42, it is preferable that through-bore 44 go all the way through mount 42 in order to provide an exit path for spring 50.

In another preferred embodiment of this invention, mount 42 is removably attached to fishing rod 20. Preferably, mount 42 houses second through-bore 46 within which fishing rod 20 is removably inserted. Removably attaching mount 42 allows the fisherman to add or remove spinning reel indicator 40 from fishing rod 20 as needed.

Guide 30 is mounted below fishing rod 20. Guide 30 has a generally circular shape which preferably conforms to the shape of a standard Fuji guide. Guide 30 provides a path for fishing line 32 to travel through from spinning reel 24 to loop 64.

Spring 50 has a generally coiled structure which is partially mounted within through-bore 44. End foot 52 is located at one end of spring 50 and extends past distal end 28 of fishing rod 20. Through-bore 44 forms a relatively tight clearance around spring 50 in order to prevent spring 50 from moving from within mount 42 during heavy use. In one preferred embodiment, spring 50 is constructed from a medium carbon steel, however other materials like aluminum, brass, or copper may be used as long as they remain relatively flexible and corrosion-resistant.

In another preferred embodiment of this invention, spring 50 is positioned above fishing rod 20. Spring 50 may alternatively be positioned beneath fishing rod 20 as long as spring 50 remains above guide 30.

Wire 56 is preferably connected with respect to spring 50. In one preferred embodiment of this invention, spring end 58 of wire 56 is connected to end foot 52 of spring 50. Loop end 60 of wire 56 opposes spring end 58 of wire 56. Wire 56 is preferably constructed from medium carbon steel. Other materials such as aluminum, brass, or copper may be used as long as they can support the weight of heavy lure while remaining relatively flexible corrosion-resistant.

Loop 64 is attached to loop end 60 of wire 56 and is constructed to receive fishing line 32. Standard Fuji guides may be used for loop 64, however, in one preferred embodiment of this invention shown in FIGS. 1–4, loop 64 may comprise a spring through which fishing line 32 is threaded.

As shown in FIG. 1, fishing line 32 is drawn from spinning reel 24 and threaded through guide 30 and then through loop 64. Lure 34 is attached to the end of fishing line 32. As shown in FIG. 2, spring 50 lightly flexes once lure 34 is attached. However, when lure 34 is dropped in the water, spring 50 moves back to a relatively unflexed position, as shown in FIG. 3, since the drag created by lure 34 in the water, removes much if not all of the force from the spring 50. When lure 34 reaches the desired depth in the water, spring 50 returns to the lightly flexed position shown in FIG. 2. Once at the desired depth, the fisherman must observe wire 56. When a force is applied to the end of the fishing line 32, like the force of a fish bite, wire 56 will move up or down signaling the fisherman that a fish may be biting at the end of fishing line 32. Once wire 56 signals the fisherman that a fish is biting, the fisherman may reel in fishing line 32 and hook the fish biting on fishing line 32.

Figure 4:
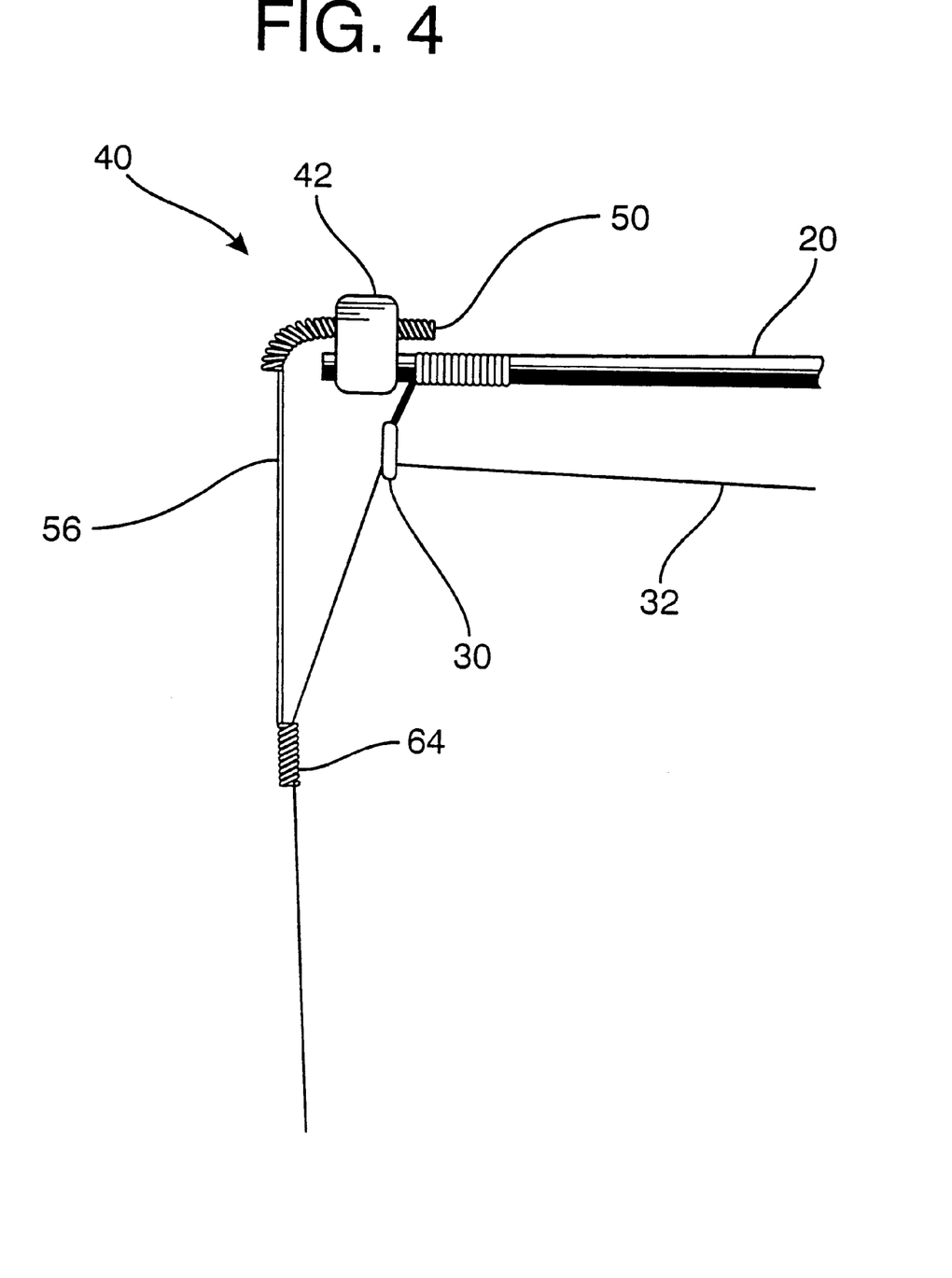
FIG. 4 is a side view of the bite indicator shown in FIG. 1 in a third position.

As shown in FIG. 4, once a fish is hooked, spring 50 may become severely flexed. However, since wire 56 remains relatively unbent, even when the force on fishing line 32 causes spring 50 to severely flex, the likelihood of damaging or breaking spinning reel indicator 40 is minimal. In addition, because wire 56 does not bend, spinning reel indicator 40 may be transported from one fishing site to another fishing site without being damaged or broken.

According to one preferred embodiment of this invention, spring 50 is adjustably mounted within through-bore 44, thus allowing a fisherman to vary the sensitivity of spinning reel indicator 40 in order detect fish of various sizes and weights. For example, spring 50 is movable within mount 44 in a first direction towards proximal end 26 of fishing rod 20, decreasing the sensitivity of spinning reel indicator 40 and thus increasing the force required to flex spring 50. Conversely, spring 50 is movable within mount 42 in a second direction towards distal end 28 of fishing rod 20, increasing the sensitivity of spinning reel indicator 40 and thus decreasing the force required to flex spring 50. By varying the sensitivity of spinning reel indicator 40, the fisherman can adjust spinning reel indicator 40 to detect fish of various sizes and weights. For example, by decreasing the sensitivity of the spinning reel indicator 40, a fisherman can detect larger fish which require larger lures and which exert more force. Conversely, by increasing the sensitivity of the spinning reel indicator 40 a fisherman can detect smaller fish, which require smaller lures and which exert less force.

FIGS. 5–8 show an ultra-sensitive bite indicator for rods with casting reels, casting reel indicator 70, according to one preferred embodiment of this invention. Casting reel indicator 70 comprises mount portion 72, adjustment portion 76, and guide loop 90. Casting reel indicator 70 is mounted on fishing rod 20, as discussed below. Fishing rod 20 comprises proximal end 26 connected to rod handle 22 and opposing distal end 28. Casting reel 25 is mounted below rod handle 22 and houses fishing line 32.

Figure 6:
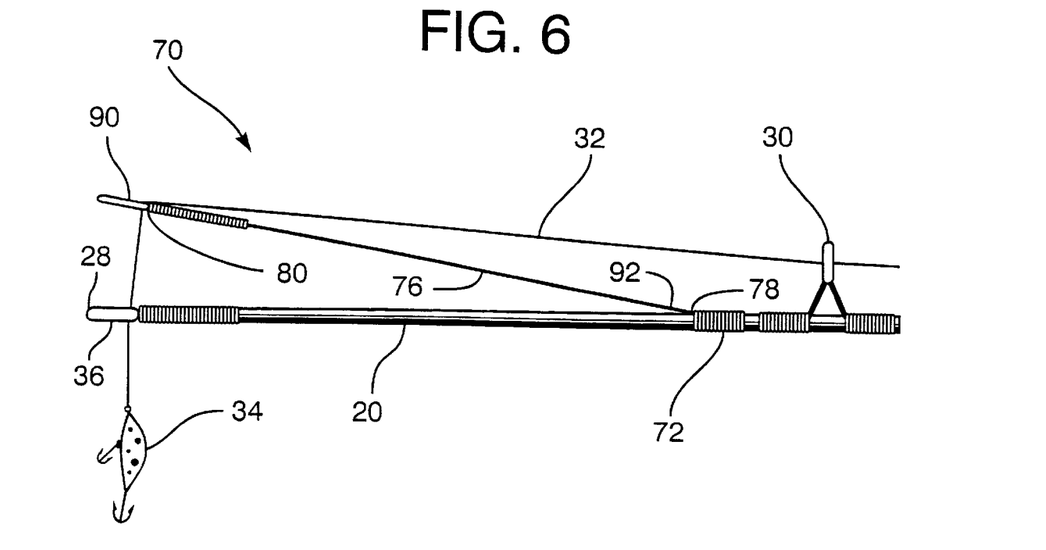
FIG. 6 is a side view of the bite indicator shown in FIG. 5 in a first position.

As shown in FIG. 6, mount portion 72 is fixedly attached onto fishing rod 20. In one preferred embodiment of this invention, mount portion 72 is located near distal end 28 of fishing rod 20. Mount portion 72 may be securely fastened onto fishing rod 20 by using wire, glue, screws or any other comparable means. In one preferred embodiment of this invention, mount portion 72 is constructed from a flat sheet of steel, however other materials like aluminum, brass, copper, or plastic may be used as long as they remain relatively flexible and corrosion-resistant.

Adjustment portion 76 comprises a first end 78 coupled to said mount portion 72 and a second end 80 opposed to said first end 78. Preferably, adjustment portion 76 has an elongated structure, however other structures which conform to the general shape of fishing rod 20 may also be used. In one preferred embodiment of this invention adjustment portion 76 has a substantially flat surface. Adjustment portion 76 is preferably constructed from a medium carbon steel, however other materials like aluminum, brass, copper, or plastic may be used as long as they remain relatively flexible and corrosion-resistant.

Figure 7:
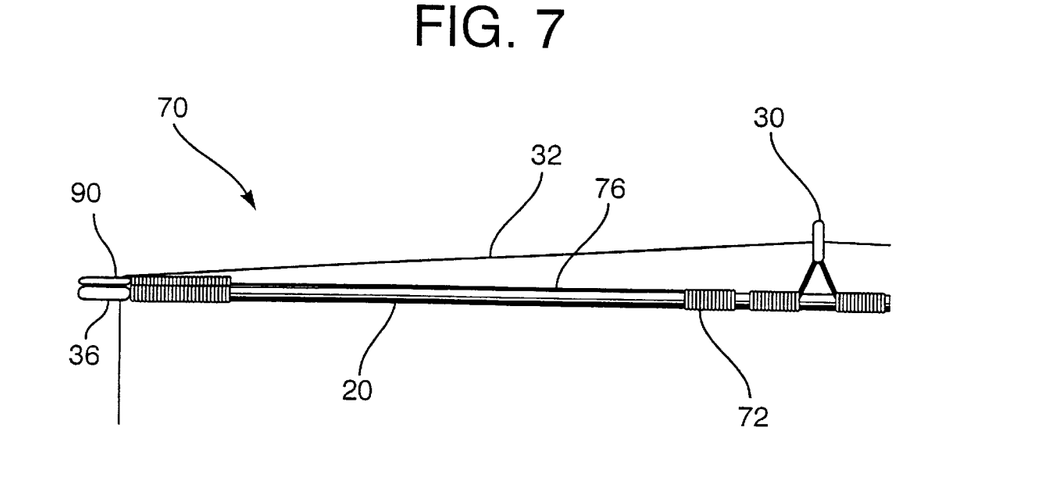
FIG. 7 is a side view of the bite indicator shown in FIG. 5 in a second position.
Figure 8:
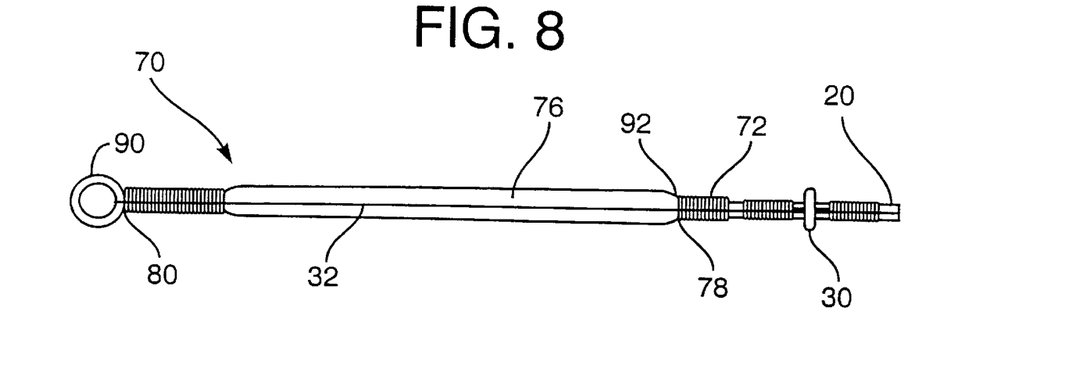
FIG. 8 is a top view of the bite indicator shown in FIG. 7.

As seen in FIGS. 6–7, adjustment portion 76 is movable between a first position angled away from fishing rod 20 and a second position lying substantially flat with respect to fishing rod 20. Adjustment portion 76 is positioned on fishing rod 20 such that second end 80 of adjustment portion 76 does not extend beyond distal end 28 of fishing rod 20 when adjustment portion 76 is in the second position.

In one preferred embodiment of this invention, adjustment portion 76 comprises biasing member 92 for biasing adjustment portion 76 when adjustment portion 76 is in the second position. Biasing member 92 is preferably constructed by bending a section of adjustment portion 76, located near first end 78, upwards and away from fishing rod 20 to the second position. If adjustment portion 76 is comprised of a flexible yet rigid material, like steel, copper, brass or the like, adjustment portion 76 should remain in the second position. However, other means, such as a spring placed between adjustment portion 76 and fishing rod 20, may be used to bias adjustment portion 76 in the second position.

Guide loop 90 is coupled to second end 80 of adjustment portion 76 and is constructed to receive fishing line 32. Guide loop 90 is positioned on second end 80 of adjustment portion 76 in such a manner so that when adjustment portion 76 is in the first position, guide loop 90 lies flat against end guide 36. Standard Fuji guides may be used for guide loop 90, however other objects such as a steel ring or a looped wire may be used to form guide loop 90.

Figure 5:
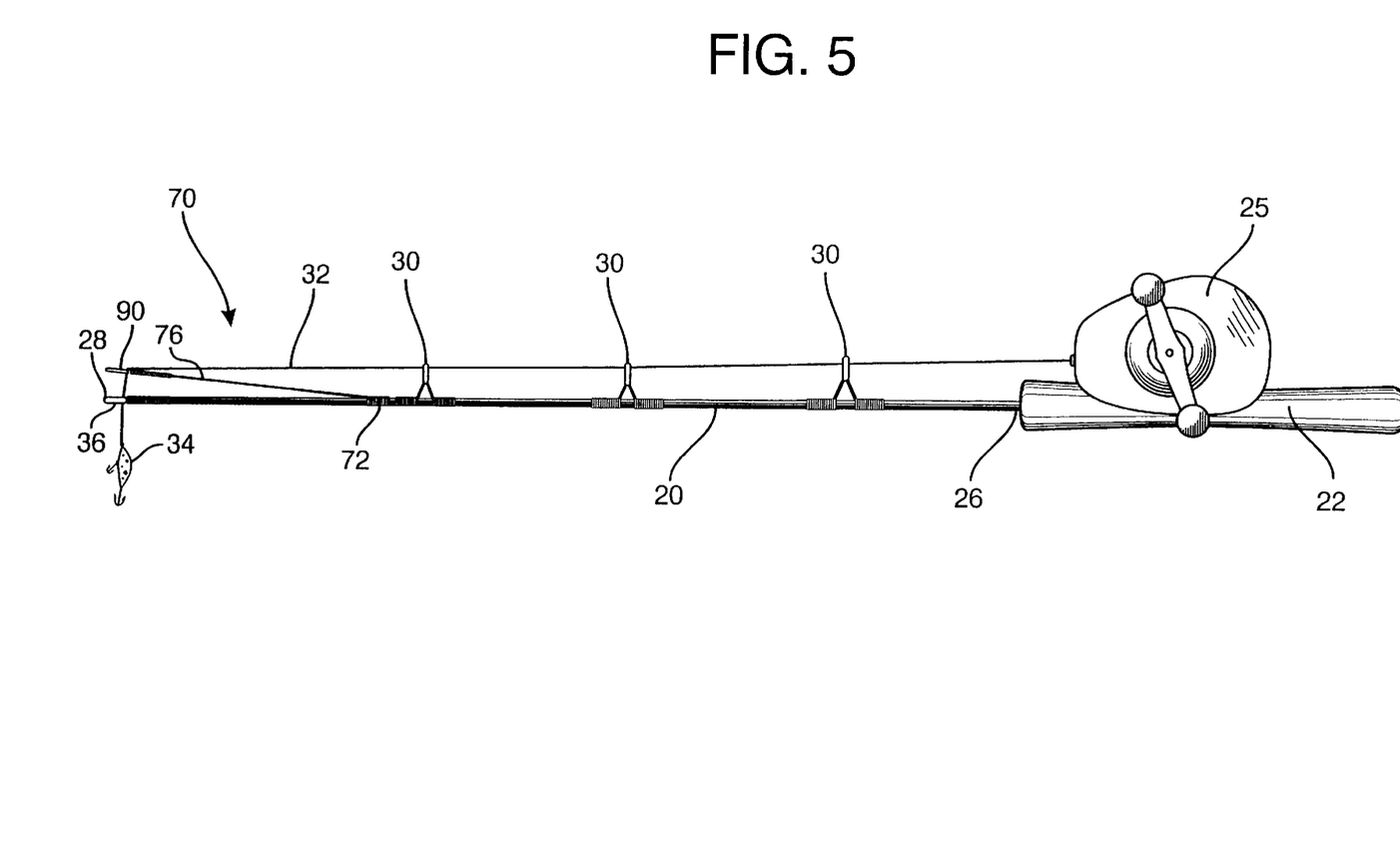
FIG. 5 is a side view of the bite indicator mounted onto a fishing rod, according to another preferred embodiment of this invention.

As shown in FIG. 5, fishing line 32 is drawn from casting reel 25 and threaded through guide 30 and then threaded through guide loop 90 and end guide 36. Lure 34 is attached to the end of fishing line 32. As seen in FIG. 6, once lure 34 is attached, the weight of lure 34 moves adjustment portion 76 to a third position in between the second position and the first position, due to the force applied onto adjustment portion 76 by the weight of lure 34. However, when lure 34 is dropped in the water, adjustment portion 76 moves back to the second position, since the drag created by lure 34 in the water, removes much if not all of the force from the spring 50. When lure 34 reaches the desired depth in the water, spring 50 returns to the third position shown in FIG. 6, signaling to the fisherman that the desired depth has been reached. Once at the desired depth, the fisherman must observe adjustment portion 76. When a force is applied to the end of fishing line 32, like the force of a fish bite, adjustment portion 76 moves up or down, signaling the fisherman that a fish may be biting at the end of fishing line 32. Once adjustment portion 76 signals the fisherman that a fish is biting, the fisherman may reel in fishing line 32 and hook the fish biting on fishing line 32.

As shown in FIG. 7, once a fish is hooked, adjustment portion 76 is moved to the first position. However, in the first position adjustment portion 76 is supported by fishing rod 20, thus making it very difficult to damage or break adjustment portion 76 even when a fish is pulling on fishing line 32. In addition, by placing adjustment portion 76 in the first position, the fisherman can easily transport casting reel indicator 70 from one fishing site to another fishing site without damage.

According to one preferred embodiment of this invention, adjustment portion 76 is adjustably mounted on fishing rod 20, thus allowing a fisherman to vary the sensitivity of casting reel indicator 70 in order detect fish of various sizes and weights. For example, adjustment portion 76 can be bent upwards and away from fishing rod 20, decreasing the sensitivity of casting reel indicator 70 and thus increasing the force required to move adjustment portion 76. Conversely, adjustment portion 76 can be bent downwards, towards fishing rod 20, increasing the sensitivity of casting reel indicator 70 and thus decreasing the force required to move adjustment portion 76. By varying the sensitivity of casting reel indicator 70, the fisherman can adjust casting reel indicator 70 to detect fish of various sizes and weights. For example, by decreasing the sensitivity of the casting reel indicator 70, a fisherman can detect larger fish which require larger lures and which exert more force. Conversely, by increasing the sensitivity of the casting reel indicator 70 a fisherman can detect smaller fish, which require smaller lures and which exert less force.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

What is claimed is:

1. In a fishing rod having a proximal end oriented near a rod handle and a distal end opposing said proximal end, a bite indicator comprising:
   a mount attached to said fishing rod, said mount having a through-bore;
   a spring having an end foot and a generally coiled structure, wherein at least a portion of said generally coiled structure is mounted within said through-bore;
   a wire having a spring end and a loop end opposing said spring end, said spring end fixedly attached to said end foot; and
   a loop attached to said loop end constructed and arranged to receive a fishing line.

2. A bite indicator in accordance with claim 1 wherein said wire comprises medium carbon steel.

3. A bite indicator in accordance with claim 1 wherein said fishing rod comprises a guide mounted below said fishing rod constructed and arranged to receive a fishing line, said spring positioned above said guide.

4. A bite indicator in accordance with claim 1 wherein said mount comprises rubber.

5. A bite indicator in accordance with claim 1 wherein said mount is positioned near said distal end.

6. A bite indicator in accordance with claim 1 wherein said loop forms a second spring.

7. A bite indicator in accordance with claim 1 wherein said generally coiled structure is adjustably mounted within said through-bore.

8. A bite indicator in accordance with claim 7 wherein said fishing rod comprises a guide mounted below said fishing rod constructed and arranged to receive a fishing line, said spring positioned above said guide.

9. A bite indicator in accordance with claim 7 wherein said mount comprises rubber.

10. A bite indicator in accordance with claim 7 wherein said mount is positioned near said distal end.

11. A bite indicator in accordance with claim 7 wherein said spring is movable in a first direction towards said proximal end and movable in a second direction towards said distal end.

12. In a fishing rod having a proximal end oriented near a rod handle and a distal end opposing said proximal end, said fishing rod having an end guide connected with the distal end, a bite indicator comprising:
   a mount portion attached to said fishing rod;
   a movable finger projecting from said mount portion, said finger movable between a first position angled away from said fishing rod and a second position substantially flat against said fishing rod; and a guide loop coupled to an end of said finger and positioned substantially coaxially with said end guide.

13. A bite indicator in accordance with claim 12 further comprising a biasing member for biasing said movable finger in said first position.

14. A bite indicator in accordance with claim 12 wherein at least a portion of said movable finger has a substantially flat surface.

15. A bite indicator in accordance with claim 12 wherein said movable finger comprises medium carbon steel.

16. A bite indicator in accordance with claim 12 wherein said mount portion is positioned near said distal end of said fishing rod.

17. A bite indicator in accordance with claim 12 wherein said guide loop conforms to the shape of a line guide.

18. A bite indicator in accordance with claim 12 wherein said fishing rod comprises a guide mounted on an upper surface of said fishing rod constructed and arranged to receive a fishing line, said movable finger mounted on said upper surface.

19. A bite indicator in accordance with claim 12 wherein said movable finger is adjustably mounted onto said fishing rod.

20. A bite indicator in accordance with claim 12, wherein said fishing rod has a width and said movable finger has a width equal to or greater than the width of said fishing rod.

21. A bite indicator in accordance with claim 12, wherein said end guide includes an aperture that extends substantially coaxially with an aperture of said guide loop.

22. A fishing rod having a bite indicator comprising:
a mount connected to an end portion opposite the handle of said fishing rod;
a flexible member having a generally coiled structure, wherein at least a portion of said generally coiled structure is mounted within said mount;
an extension member extending away from said flexible member; beyond said end portion and
adapted to indicate a fish bite;
a fishing line receiving member attached to an end portion of said extension member.

23. A bite indicator in accordance with claim 22, wherein said generally coiled structure is movable between a first direction extending away from said mount and a second direction moving towards said mount.

24. A bite indicator in accordance with claim 22, wherein said mount comprises a through-bore and said generally coiled structure is mounted within said through-bore.

\* \* \* \* \*

UNITED STATES PATENT AND TRADEMARK OFFICE
CERTIFICATE OF CORRECTION

PATENT NO. : 6,125,573
DATED : October 3, 2000
INVENTOR(S) : Gregory Wilczynski

It is certified that error appears in the above-identified patent and that said Letters Patent is hereby corrected as shown below:

Claim 22,
Line 8, change "member; beyond" to -- member beyond --.
Line 9, change "fish bite;" to -- fish bite; and --.

Signed and Sealed this

Twenty-third Day of October, 2001

Attest:

NICHOLAS P. GODICI
Attesting Officer    Acting Director of the United States Patent and Trademark Office